US006998983B2

(12) United States Patent
Charych et al.

(10) Patent No.: US 6,998,983 B2
(45) Date of Patent: Feb. 14, 2006

(54) SYSTEM AND METHOD FOR TRACKING DATA RELATED TO CONTAINERS USING RF TECHNOLOGY

(75) Inventors: Hal Charych, East Setauket, NY (US); Raj Bridgelall, Mount Sinai, NY (US); Avi Nudelman, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 301 days.

(21) Appl. No.: 10/717,062

(22) Filed: Nov. 19, 2003

(65) Prior Publication Data
US 2005/0107092 A1   May 19, 2005

(51) Int. Cl.
*G08B 13/14* (2006.01)

(52) U.S. Cl. ............... 340/572.8; 340/572.1; 340/10.42

(58) Field of Classification Search ......... 340/572.8, 340/572.1, 572.4, 5.92, 10.42; 235/376, 235/385
See application file for complete search history.

(56) References Cited

U.S. PATENT DOCUMENTS

| 5,869,820 A | * | 2/1999 | Chen et al. ............. 235/376 |
| 6,714,121 B1 | * | 3/2004 | Moore .................... 340/10.3 |
| 6,870,464 B1 | * | 3/2005 | Okamura ................ 340/10.51 |
| 6,956,538 B1 | * | 10/2005 | Moore .................... 343/878 |

* cited by examiner

*Primary Examiner*—Toan N. Pham
(74) *Attorney, Agent, or Firm*—Fay Kaplun & Marcin, LLP

(57) ABSTRACT

Described are RF tracking system and method. The RF system may include a shell for holding a plurality of containers which store a material that interferes with RF communications. The shell includes a bottom container supporting surface and a plurality of leg extensions attached thereto; the shell extends away from the bottom surface. The tracking system also includes at least one RF tag attached to a first one of the leg extensions. The tag has a memory arrangement storing data relating to at least one of an identity of the shell, an identity of the containers held in the shell and a material stored in the containers. Furthermore, the tracking system includes at least one RF scanner communicating with the tag to collect the data and a computing arrangement which includes a database and communicating with the scanner to update the database as a function of the collected data. The tag is situated at a predetermined distance away from the containers held in the shell to overcome an electromagnetic dampening effect of the material.

29 Claims, 4 Drawing Sheets

US 6,998,983 B2

SYSTEM AND METHOD FOR TRACKING DATA RELATED TO CONTAINERS USING RF TECHNOLOGY

BACKGROUND INFORMATION

Conventional tracking systems have utilized Radio Frequency ("RF") tags attached to assets (e.g., a computer, a mechanical device, machinery, equipment, etc.) to identify, locate, and/or track such assets. One of the major benefits of such RF tracking systems is that line of sight ("LOS") between an RF reader or interrogator and the RF tag is not required for communication. This allows a large group of assets to be entered into an RF tracking system, as the assets pass through the electromagnetic field generated by the RF scanner, without requiring any significant handling effort. In contrast to RF tracking systems, bar code tracking systems require the LOS between a bar code reader and a bar code to successfully transfer data. Thus, the asset must be physically handled to place the bar code in front of the bar code reader.

Another feature of RF tracking systems is that RF tags are capable of surviving in harsh and hostile environments which may damage bar codes. In addition, RF tracking systems are capable of registering and tracking a plurality of assets at the same time, while bar code scanners read one bar code at a time. These features make RF tracking systems more robust and easier to manage than bar code tracking systems.

Conventional RF tracking have not generally been utilized in conjunction with the manufacture and distribution of liquids and/or metals (e.g., beverage, chemical, pharmaceutical, etc.) to automatically identify and track data from the liquid containers placed into reusable plastic carriers ("shells").

FIG. 1 shows a conventional shell 40 holding a plurality of containers 3 (e.g., sixteen). The shell 40 may be utilized by manufacturers and distributors to transport containers 3 filled with a material (e.g., liquid, metal, etc.) 5. The shells 40 may be stacked on top of each other and next to each other for storage and/or transport. The shell 40 includes a base bottom 2 which has a substantially rectangular shape and four side walls 4.

The design of the shell 40 has made it difficult for liquid manufacturers and distributors to utilize the RF technology. The material 5 in the container 3 has a dampening effect on electromagnetic fields and prevents efficient energy coupling which is required for the use of the RF technology. There is a need for a system that would allow utilization of the RF technology for tracking shells holding containers filled with the liquid material.

SUMMARY OF THE INVENTION

The present invention relates to an RF tracking system and method which includes a shell for holding a plurality of containers which store a material that interferes with RF communications. The shell includes a bottom container supporting surface and a plurality of leg extensions attached thereto; the shell extends away from the bottom surface.

The tracking system also includes at least one RF tag attached to a first one of the leg extensions. The tag has a memory arrangement storing data relating to at least one of an identity of the shell, an identity of the containers held in the shell and a material stored in the containers.

Furthermore, the tracking system includes at least one RF scanner communicating with the tag to collect the data and a computing arrangement which includes a database and communicating with the scanner to update the database as a function of the collected data. The tag is situated at a predetermined distance away from the containers held in the shell to overcome an electromagnetic dampening effect of the material.

DETAILED DESCRIPTION

Figure 2:
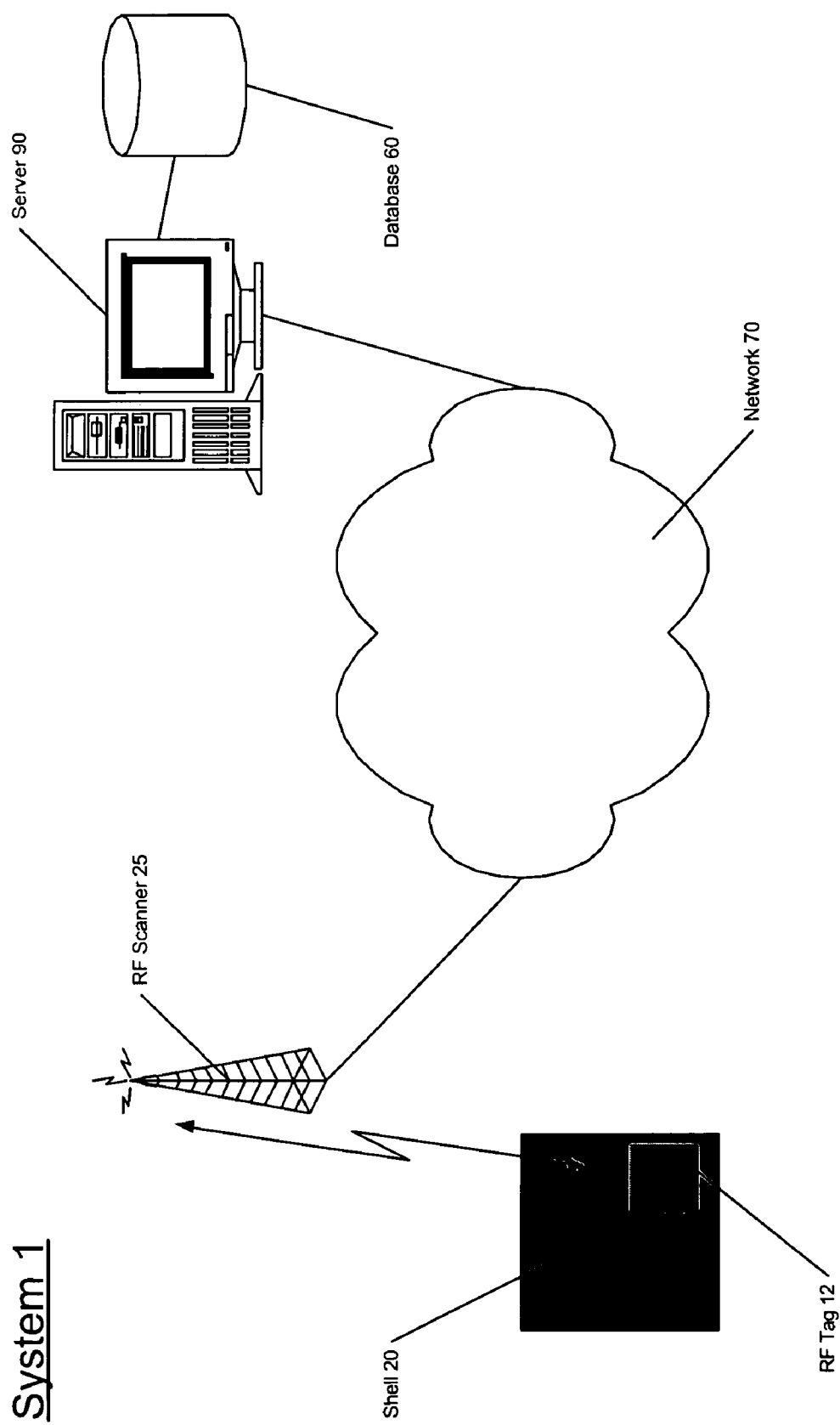
FIG. 2 shows an exemplary embodiment of a system according to the present invention.

FIG. 2 shows an exemplary embodiment of an RF tracking system 1 according to the present invention. The system 1 may include at least one conventional RF scanner 25, a plurality of RF tags 12, a server 90 and a communication network 70. The system 1 may be utilized to track a shell 20 holding a plurality of containers 3 filled with a material 5 (e.g., liquid, metal, etc.). Those skilled in the art will understand that, although the system 1 is described herein in regard to liquid-filled containers, the present invention may be applied equally well to systems for transporting and/or storing containers including any material which interferes with the energy coupling required for an RF tracking system.

The RF scanner 25 may interrogate, using RF signals, the RF tag 12 which is attached to the shell 20. Once the RF scanner 25 obtains the response signals from the RF tag 12, the response signals are forwarded to the server 90 via the network 70 (e.g., a hardwired network and/or a wireless network). The server 90 may convert the response signals into data and store it in a database 60. Then, the server 90 may analyze the data to generate a predetermined response. Such a response may be transmitted back to the RF tag 12. Those skilled in the art would understand that the system 1 may operate within a plurality of frequencies, such as a low-frequency band (e.g., 30 KHz to 500 KHz) which have a shorter reading range and a lower system cost or a high-frequency band (e.g., 850 MHz to 950 MHz and 2.4 GHz to 2.5 GHz).

Figures 1, 3:
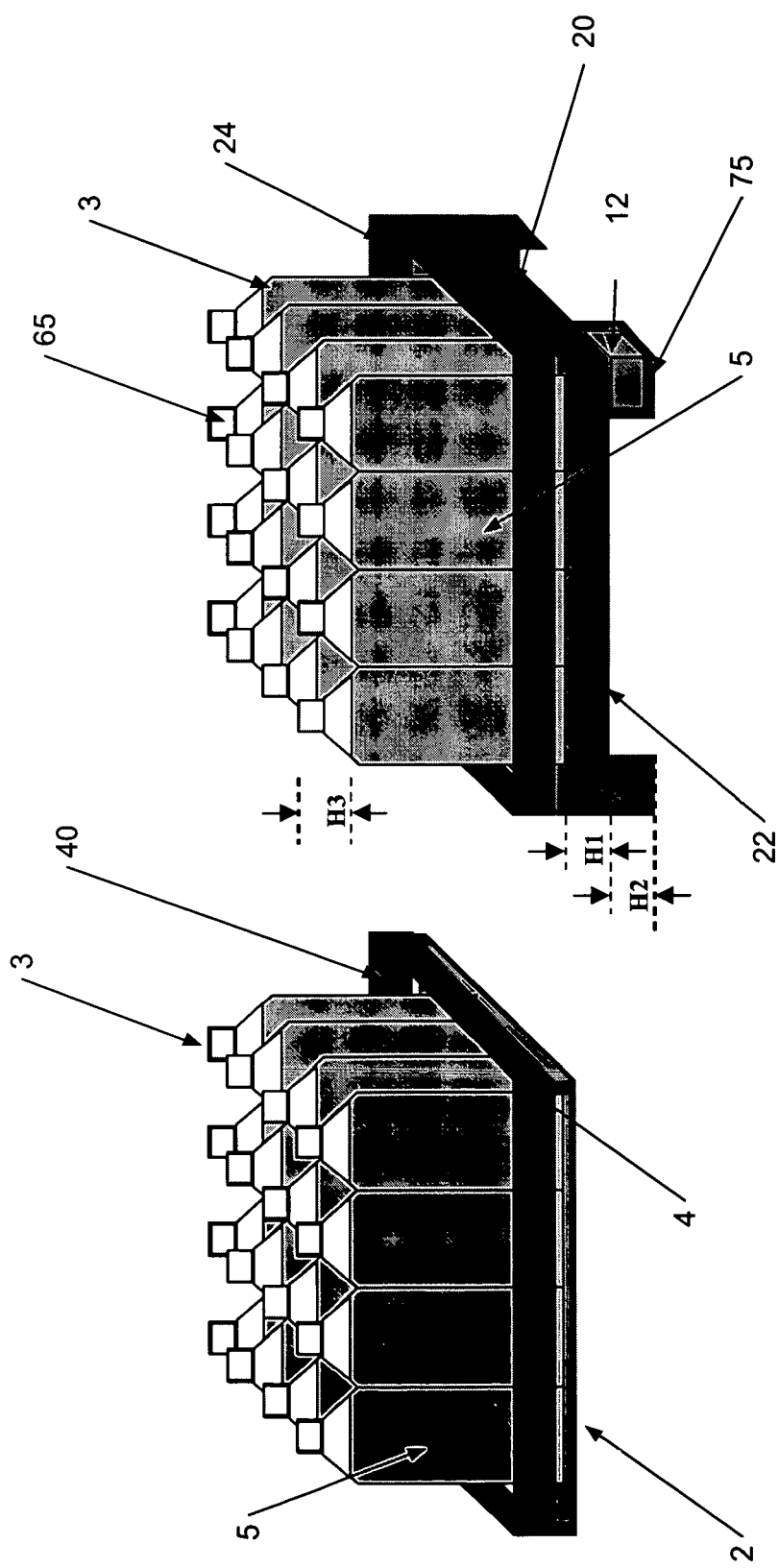
FIG. 1 shows a conventional shell holding containers filled with a liquid material.
FIG. 3 shows an exemplary embodiment of a shell according to the present invention.

The RF tag 12 may include an RF transceiver and a memory storage device which stores information relating to the shell 20, the container 3 and/or the material 5. The RF tag 12 may come in any of a variety of shapes and sizes. For example, the RF tag 12 may have an L shape (e.g., a corner tag) as shown in FIG. 3. In addition, the RF tags 12 may be categorized as either active or passive. An active RF tag may have an internal battery and include a data storage device that is usually read/write. In addition, an active RF tag has a longer read range than a passive RF tag. In contrast, a passive RF tag does not have an internal battery and usually includes only a Read Only Memory (ROM), as the memory stored device. A passive RF tag obtains its operating power from the RF scanner 25.

FIG. 3 shows an exemplary embodiment of the shell 20 according to the present invention. The shell 20 preferably holds the plurality of containers 3 (e.g., sixteen) which are filled with the material 5 (e.g., a liquid). When filled with the material 5, each container 3 has an ullage H3 created between the top of the material 5 and a cap 65. For example, some manufacturers have a certain amount of ullage in the container 3 in order to allow for gas expansion and "breathing".

The shell 20 may have a substantially rectangular or square shape and formed by four side walls 24 and a bottom 22. The thickness H1 of the bottom 22 is greater than the thickness of the bottom 2. The side walls 24 and bottom 22 may be made from any of a plurality of the materials including, plastic, wood, metal or maybe made from a combination of these materials. In addition, the shell 20 includes a plurality of leg extensions 75; each leg extension 75 extends a length H2 from the bottom 22 (e.g., at each corner of the bottom 22) to increase the stability of the shell 20.

The RF tag 12 is preferably mounted on the leg extension 75 or within the leg extension 75 (e.g., using a plastic over-molding embedding process) so that, when the shell 20 rests on its leg extensions 75, the RF tag 12 is maintained, e.g., substantially parallel to the vertically mounted RF scanner 25. Of course, those skilled in the art will understand that the orientations of the RF tag 12 may be altered to accommodate any orientation of the RF scanner 25 and vice-versa. The RF tag 12 may be mounted on a plurality of the leg extensions 75, e.g., two leg extensions 75 which are situated at the diagonally opposite corners of the bottom 22. This placement may maximize the RF signal strength regardless of how the shells 20 are stacked.

The thickness H1 of the bottom 22 is preferably greater than the thickness of the bottom 2 of the conventional shell 40 (shown in FIG. 1). The RF tag 12 is separated from the material 5 contained in the container 3 by an increased distance (in the form of thicker bottom 22) sufficient to overcome the dampening effect of the material 5 and improves the RF communication with the RF scanner 25. Similarly, the perimeter thickness of the shell 20 is preferably greater than the perimeter thickness of the conventional shell 40 so that the adjacent shells 20 are sufficiently separated to overcome the electromagnetic dampening effect of the material 5.

Figure 4:
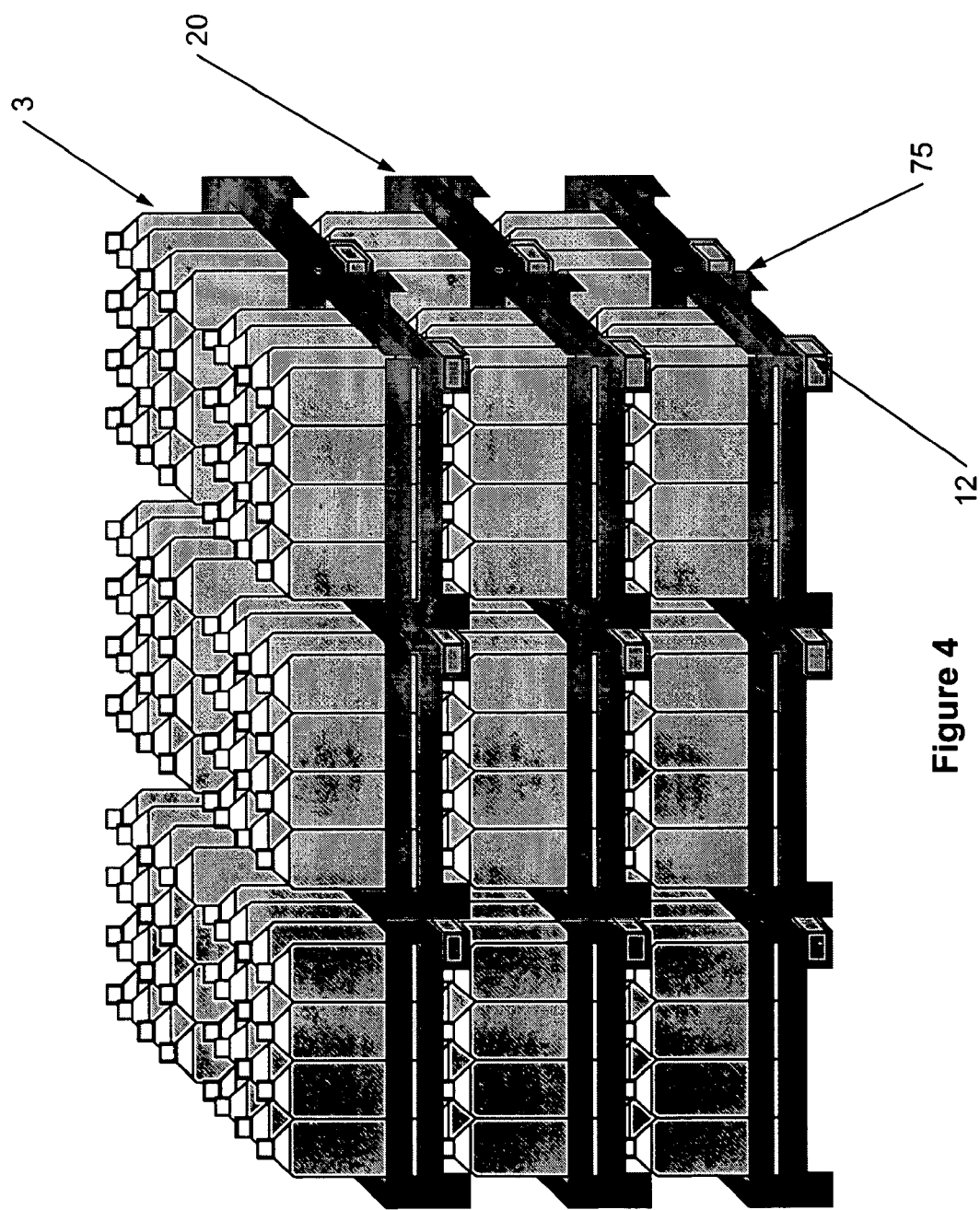
FIG. 4 shows a plurality of the shells of FIG. 3 stacked together on a pallet.

The placement of the RF tag 12 on and the increased thicknesses H1 of the bottom 22 and the perimeter, and the ullage H3 (from the containers 40 stacked below the tag 12 as shown in FIG. 4) create an air gap. This air gap is large enough to overcome the material 5's dampening effect on the electromagnetic field. For example, the RF tag 12 is preferably separated from the material 5 by at least 5 cm (which includes the air gap between the material 5, the thickness of the sidewalls 24, and the thickness H1). In addition, the optimal spacing of the RF tag 12 and the material 5 may dependent on the wavelength of radio waves on which the RF tag 12 operates. The optimal spacing of the tag 12's antenna and the material 3 should preferably be approximately one-quarter of the operational wavelength, if the material 3 is a metal; and one-third of the wavelength if the material 3 is a liquid or other damp material. As discussed above, those skilled in the art will understand that the RF tag 12 may operate on a plurality of wavelengths, hence the optimal spacing will vary accordingly.

Figure 5:
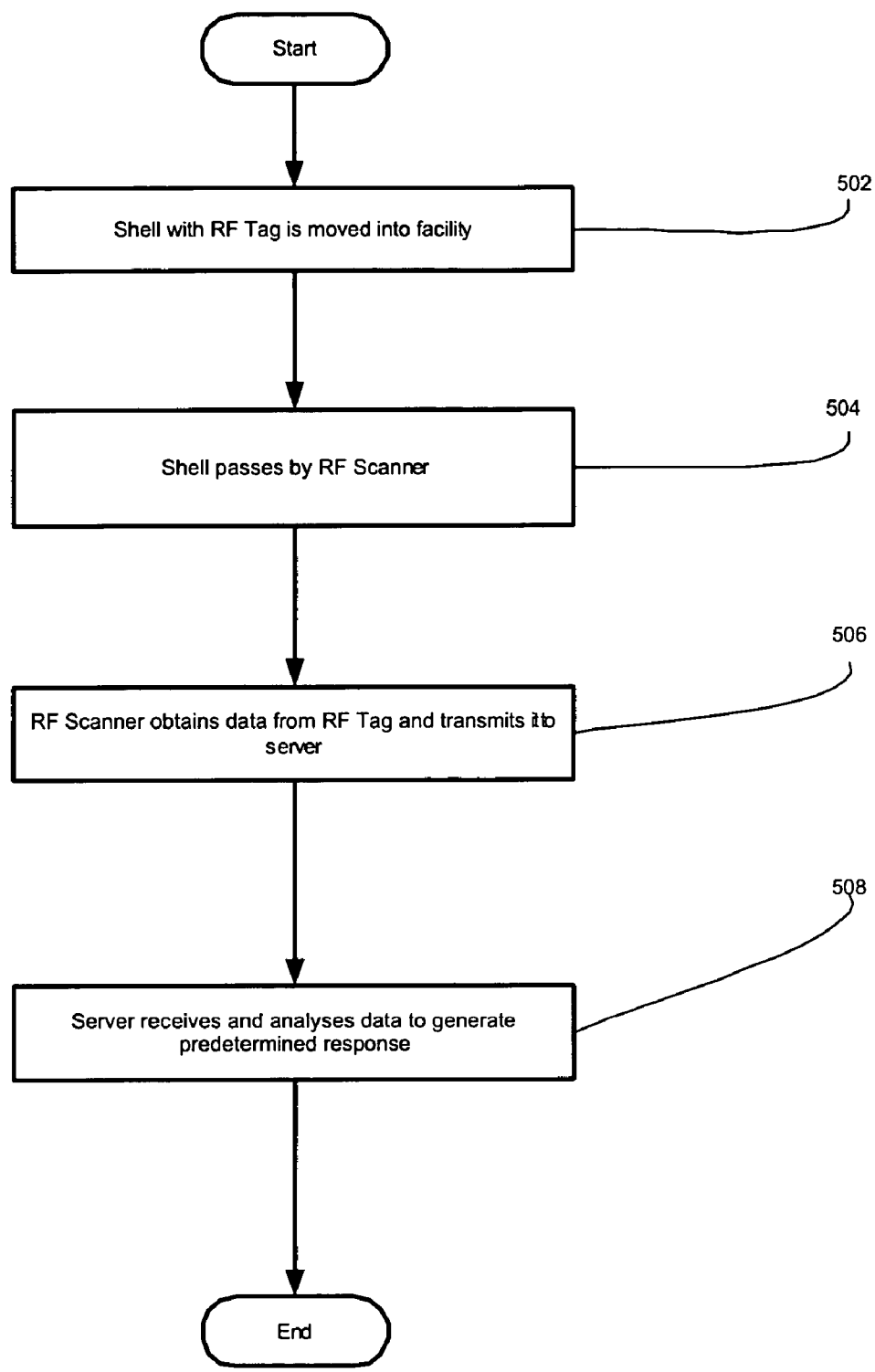
FIG. 5 shows an exemplary embodiment of a method according to the present invention.

The system 1 may be utilized in a plurality of settings (e.g., manufacturing facilities, storage facilities, retail facilities, etc.) to track various data (e.g., a quantity of containers 3 in the shell 20, a lot number and expiration date of the material 5, a destination of the shell 20, etc.). FIG. 5 shows an exemplary embodiment of a method according to the present invention. For example, the system 1 may be used to automatically track the containers 3 (e.g., in real time) and then generate an appropriate response. In step 502, the shell 20 is being moved into a particular facility. As the shell 20 with the RF tag 12 enters the facility, it passes by the RF scanner 25 (step 504). The RF scanner 25 obtains the data from the RF tag 12 and transmits it, via the network 70, to the server 90 (step 506).

In step 508, the server 90 receives and analyzes the data to generate a predetermined response. For example, the server 90 may adjust inventory data accordingly. If the inventory data indicates that an amount of the containers 3 in a given area has dropped below a pre-set level, the server 90 performs a plurality of functions (e.g., generating an order for the product; ordering product moved from one location to another, etc.).

FIG. 4 shown a plurality of the shells 20 stacked for transportation on a pallet. Each RF tag 12 has a sufficient air gap so as to optimally couple with the penetrating RF energy from the RF scanner 25. If the shell 20 has at least two RF tags 12 placed on diagonally opposite corner leg extensions 75, then at least one RF tag 12 will always be parallel to the RF scanner 25 regardless of the shell 20's orientation on the pallet.

In addition, the system 1 may be used for quality control. For example, the required parameters (e.g., expiration date) of the container 3 may be entered into the database 60, so that when shells 20 pass by the RF scanner 25, the RF scanner 25 reads the data and transmits it to the server 90. The server 90 compares the obtained data with the data stored in the database 60. When a match is found (e.g., the shell 20 includes containers 3 that have an expiration date exceeding the predetermined norm), the server 90 than generates a preprogrammed message indicating handling instructions for the corresponding shell 20 (e.g., the containers 3 of the corresponding shell 20 should be discarded). The preprogrammed message may be as simple as an alarm sound, a red light turning on, or may include a more involved audio or a visual handling instructions, etc. Thus, the shells 20 meeting the specified parameters are identified and may be handled as desired.

Those skilled in the art will understand that various modifications and changes may be made to the embodiments without departing from the broadest spirit and scope of the present invention as set forth in the claims that follow. The specification and drawings, accordingly, should be regarded in an illustrative rather than restrictive sense.

The invention claimed is:

1. An RF tracking system, comprising:
   a shell for holding a plurality of containers for storing a material which interferes with RF communications, the shell including a bottom container supporting surface and a plurality of leg extensions attached thereto and extending away from the bottom surface;
   at least one RF tag attached to a first one of the leg extensions and including a memory arrangement storing data relating to at least one of an identity of the shell, an identity of the containers held in the shell and a material stored in the containers;
   at least one RF scanner communicating with the tag to collect the data; and
   a computing arrangement including a database and communicating with the scanner to update the database as a function of the collected data,
   wherein the tag is situated at a predetermined distance away from the containers held in the shell to overcome an electromagnetic dampening effect of the material.

2. The system according to claim 1, wherein the material includes at least one of a liquid and a metal.

3. The system according to claim 1, wherein the computing arrangement updates the database in real time.

4. The system according to claim 1, wherein the at least one RF tag is mounted on the first extension leg in such a manner that when the shell rests on the plurality of leg extensions, the RF tag is maintained substantially parallel to the RF scanner.

5. The system according to claim 1, wherein a further RF tag is attached to a second one of the plurality of leg extensions, the second leg extension being located diagonally opposite to the first leg extension.

6. The system according to claim 1, wherein the tag has a substantially L shape.

7. The system according to claim 1, wherein the tag is embedded within the leg extension.

8. The system according to claim 1, wherein the tag includes one of an active RF tag and a passive RF tag.

9. The system according to claim 1, wherein the tag and the material is separated by a predetermined distance.

10. The system according to claim 9, wherein the predetermined distance corresponds a wavelength of a radio wave utilized for the RF communications between the tag and the scanner.

11. The system according to claim 1, wherein the computing arrangement generates a response signal as a function of the collected data.

12. The system according claim 11, wherein the response signal is transmitted to the tag to update the data.

13. A shell for holding a plurality of containers which stores a material, comprising:
 a bottom container supporting surface;
 a plurality of leg extensions attached thereto and extending away from the bottom surface; and
 at least one RF tag attached to a first one of the leg extensions and including a memory arrangement storing data relating to at least one of an identity of the shell, an identity of the containers and a material stored in the containers, the tag being situated at a predetermined distance away from the containers to overcome an electromagnetic dampening effect of the material which interferes with RF communications between the tag and an RF scanner.

14. The shell according to claim 13, wherein the scanner collects the data from the tag and provides the collected data to a computing arrangement for processing.

15. The shell according to claim 13, wherein the material includes at least one of a liquid and a metal.

16. The shell according to claim 13, wherein the shell has a substantially rectangular shape.

17. The shell according to claim 13, wherein the at least one RF tag is mounted on the first extension leg in such a manner that when the shell rests on the plurality of leg extensions, the RF tag is maintained substantially parallel to the RF scanner.

18. The shell according to claim 13, wherein a further RF tag is attached to a second one of the plurality of leg extensions, the second leg extension being located diagonally opposite to the first leg extension.

19. The shell according to claim 13, wherein the tag has a substantially L shape.

20. The shell according to claim 13, wherein the tag is embedded within the leg extension.

21. The shell according to claim 13, wherein the tag includes one of an active RF tag and a passive RF tag.

22. The shell according to claim 13, wherein the tag and the material is separated by a predetermined distance.

23. The shell according to claim 22, wherein the predetermined distance corresponds a wavelength of a radio wave utilized for the RF communications between the tag and the scanner.

24. A method, comprising the steps of:
 scanning with an RF scanner to detect presence of an RF tag, the RF tag being attached to a shell which holds a plurality of containers for storing a material which interferes with RF communications, the shell including a bottom container supporting surface and a plurality of leg extensions attached thereto and extending away from the bottom surface, the RF tag attached to a first one of the leg extensions and including a memory arrangement storing data relating to at least one of an identity of the shell, an identity of the containers held in the shell and a material stored in the containers;
 obtaining data from the RF tag the RF scanner;
 providing the data to a computing arrangement; and
 generating a predetermined response by the computing arrangement as a function of the collected data and predefined rules,
 wherein the RF tag is situated at a predetermined distance away from the containers held in the shell to overcome an electromagnetic dampening effect of the material.

25. The method according to claim 24, wherein the material includes at least one of a liquid and a metal.

26. The method according to claim 24, wherein the predetermined response is to update a database of the computing arrangement as a function of the collected data.

27. The method according to claim 24, wherein the at least one RF tag is mounted on the first extension leg in such a manner that when the shell rests on the plurality of leg extensions, the RF tag is maintained substantially parallel to the RF scanner.

28. The method according to claim 24, wherein a further RF tag is attached to a second one of the plurality of leg extensions, the second leg extension being located diagonally opposite to the first leg extension.

29. The method according claim 24, further comprising the step of:
 proving the response to the RF tag via the RF scanner.

* * * * *